(12) United States Patent
Moore

(10) Patent No.: US 11,256,631 B1
(45) Date of Patent: Feb. 22, 2022

(54) ENHANCED SECURITY VIA DYNAMIC REGIONS FOR MEMORY PROTECTION UNITS (MPUS)

(71) Applicant: Ralph Crittenden Moore, Costa Mesa, CA (US)

(72) Inventor: Ralph Crittenden Moore, Costa Mesa, CA (US)

(*) Notice: Subject to any disclaimer, the term of this patent is extended or adjusted under 35 U.S.C. 154(b) by 0 days.

(21) Appl. No.: 16/746,559

(22) Filed: Jan. 17, 2020

(51) Int. Cl.
*G06F 12/00* (2006.01)
*G06F 12/14* (2006.01)

(52) U.S. Cl.
CPC ................. *G06F 12/1441* (2013.01)

(58) Field of Classification Search
CPC .................................................. G06F 12/1441
See application file for complete search history.

(56) References Cited

U.S. PATENT DOCUMENTS

| | | | | |
|---|---|---|---|---|
| 2003/0014607 A1* | 1/2003 | Slavin | ................... | G06F 9/5016 711/170 |
| 2008/0086603 A1* | 4/2008 | Lahtinen | ............. | G06F 12/0653 711/147 |
| 2008/0276051 A1* | 11/2008 | Renno | ................. | G06F 12/1441 711/154 |
| 2015/0227462 A1* | 8/2015 | Grocutt | ................... | G06F 12/06 711/147 |
| 2015/0371046 A1* | 12/2015 | Chen | ..................... | G06F 21/575 713/2 |
| 2016/0026791 A1* | 1/2016 | Melski | ..................... | G06F 21/54 726/25 |
| 2020/0159512 A1* | 5/2020 | Schutt | ....................... | G06F 8/61 |

* cited by examiner

*Primary Examiner* — Shawn X Gu
*Assistant Examiner* — Mohammad S Hasan (57) ABSTRACT

This invention relates to the use of dynamic MPU regions to enhance the security and ease of development of multitasking embedded and similar systems.

16 Claims, 6 Drawing Sheets

ENHANCED SECURITY VIA DYNAMIC REGIONS FOR MEMORY PROTECTION UNITS (MPUS)

CROSS REFERENCE TO RELATED APPLICATIONS

This application claims the priority of U.S. provisional application 62/801,039 filed on Feb. 4, 2019. It is incorporated by reference in its entirety.

PROGRAM LISTINGS mpu.c contains region get and make functions.
mpu.h provides macros necessary to define MPU regions and Memory Protection Arrays (MPAs)
xblk.c contains protected block get, make, and release functions.
xmsg.c contains protected message send and receive functions.
xtask.c contains task create function with protected stack.
tmpu.c provides demo code showing how to use protected blocks, messages, and stacks.

The foregoing contain most of the code related to the inventive material herein. However, many small code segments are spread throughout the SMX RTOS, which hosts this code. In order to run the code it is necessary to have an evaluation copy of the SMX RTOS and its board support code. This is available for free download from ftp://ftp.smxrtos.com/publ/patent_mpu2.zip. In addition, the JAR EWARM v8.20.1 development tools are needed. A free evaluation kit for these tools is available at www.iar.com. Also necessary is an ST Micro STM32746G-EVAL2 evaluation board to run the code. If the board is no longer available contact support@smxrtos.com for assistance in using a newer board.

BACKGROUND

As embedded systems are drawn more into the Internet of Things (IoT), hacks and malware attacks are becoming increasingly frequent. Thus, security of embedded systems is becoming increasingly important. One tactic for security is to divide the software of an embedded system into many isolated regions. Then if a hacker gains access to one region he cannot access code or data in other regions, as is the case if regions are not isolated from each other.

Most embedded systems use Micro Controller Units (MCUs), which have lower performance processors and much less memory than other systems such as servers, desktop computers, or even smart phones. For memory protection, MCUs normally provide Memory Protection Units (MPUs) rather than Memory Management Units (MMUs) as are found in larger processors. Because of this and due to the fact that all embedded system code is normally linked into a single executable achieving 100% partition isolation is much more difficult in embedded systems than it is in larger systems using MMUs.

Partition isolation is achieved in MCU systems by defining code and data regions which are unique to each partition. A region consists of contiguous memory with a starting memory address, a memory size, and memory attributes. Attributes supported depend upon the MPU, but typically are read/write, read only, and execute never. When a task in a partition starts running, regions for its partition are loaded into the MPU. The MPU insures that memory in these regions can be accessed and only as permitted by each region's attributes. For example, there might be a code region (read-only and execute) from location 0×200000 of size 0x4000 and there might be a data region (read/write, execute never) from location 0×10000000 of size 0x1000. Attempted accesses outside of MPU regions or with the wrong attributes (e.g. attempt to execute data) result in termination of task operation and transfer of control to the operating system. This is very effective at blocking malware in order to minimize damage by it.

Security also requires that an MCU have a privileged mode where system software runs and the MPU can be changed and an unprivileged mode where application and middleware partitions run. Switching from unprivileged mode to privileged mode usually can only be accomplished by triggering an exception, which causes privileged code to run and thus a hacker in an unprivileged partition cannot change the MPU. Needless to say privileged code is designed to be very difficult to hack and is strongly protected.

The standard method to create regions is to use compiler pragmas to define which code or data goes into a named section. Then a linker command file defines which sections go into blocks and the size, alignment, and sequence of the blocks. Finally the linker command file defines where the blocks go in memory. Then code defines blocks as regions, which meet the requirements of the MPU (e.g. some MPUs require sections to be powers of 2 in size). For some MPUs subregions must also be defined for blocks. For the purpose of discussion, herein, these are called static regions. The term static is used because regions defined this way cannot be changed after the software is compiled and linked. A previous patent application (Moore, application Ser. No. 15/863,913) discussed methods to define and utilize static regions

SUMMARY OF THE INVENTION

The subject matter of this invention is the introduction of dynamic regions which are defined in the code and do not require linker commands. Hence they are generated in a more automatic manner, which frees the programmer of significant details. This can enable dramatic reduction in programming time and in programming errors.

Also dynamic regions are very important to support conditional and run-time dependent code and data. For example, certain code may be included or not, depending upon product options, installation variables, or run-time variations. Another example is that a buffer size may need to be determined at run time because it depends upon available memory. These kinds of requirements are difficult to handle with linker commands.

The inventive material introduced herein covers the following kinds of dynamic regions:
1. Dynamic template regions.
2. Permanent task stack regions.
3. Temporary task stack regions.
4. Protected blocks.
5. Protected messages.

In addition the use of protected messages to securely transfer data between isolated regions is introduced.

Figure 1:
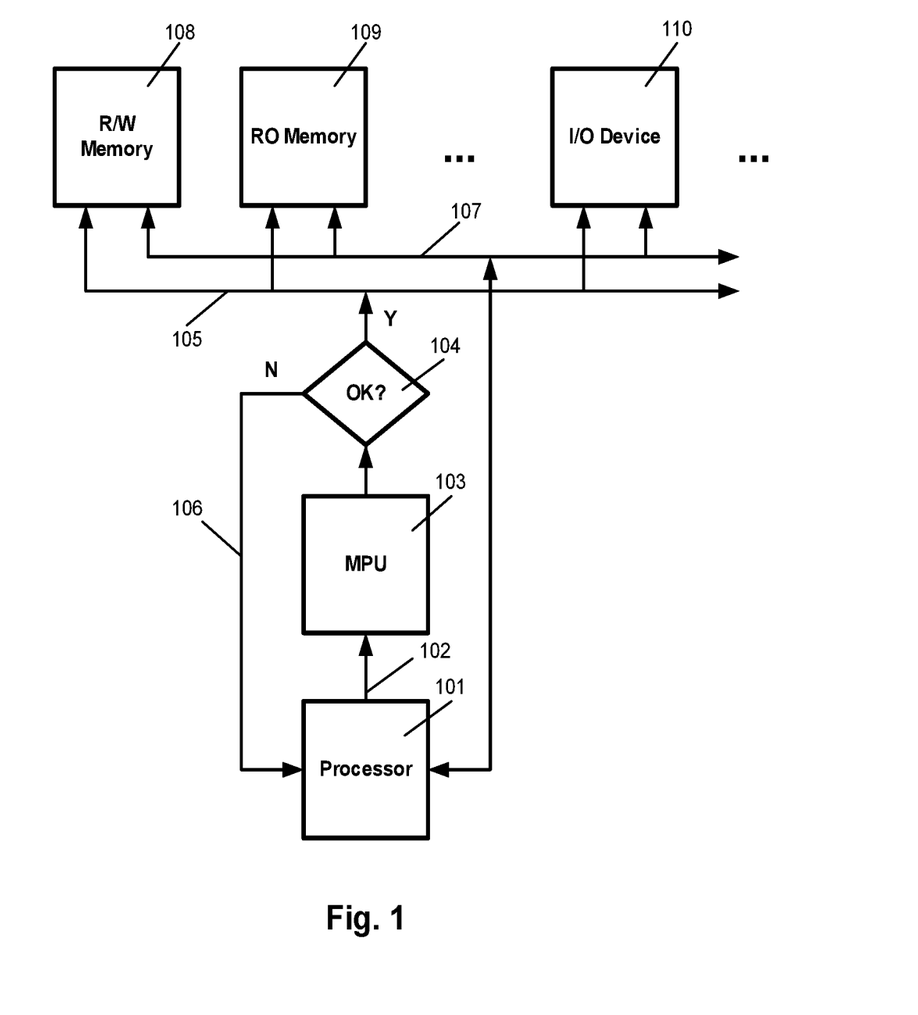
FIG. 1 shows the preferred embodiment of the inventive material herein. It shows connection of a Memory Protection Unit (MPU) to a processor, Read/Write memory, Read-Only memory, possible other memories, an Input/Output peripheral device, and possible other devices.

The preferred embodiment of the inventive material herein is illustrated in FIG. 1. It consists of one processor, one memory protection unit (MPU), one or more read/write memories, one or more read-only memories and one or more I/O devices or peripherals all connected via a single system bus. It should be apparent to one skilled in the art that other embodiments are possible, such as: multiple processors (either multiple cores on the same chip or multiple processors on different chips), multiple MPUs (each connecting to the same or to different system buses), multiple system buses, and read/write memory only or other types of memory. In addition, the preferred embodiment of the inventive material herein uses the ARM Cortex-M architecture including its MPU. It should be apparent to one skilled in the art that embodiments using other processor and MPU architectures are also supported.

DETAILED DESCRIPTION

Figure 2:
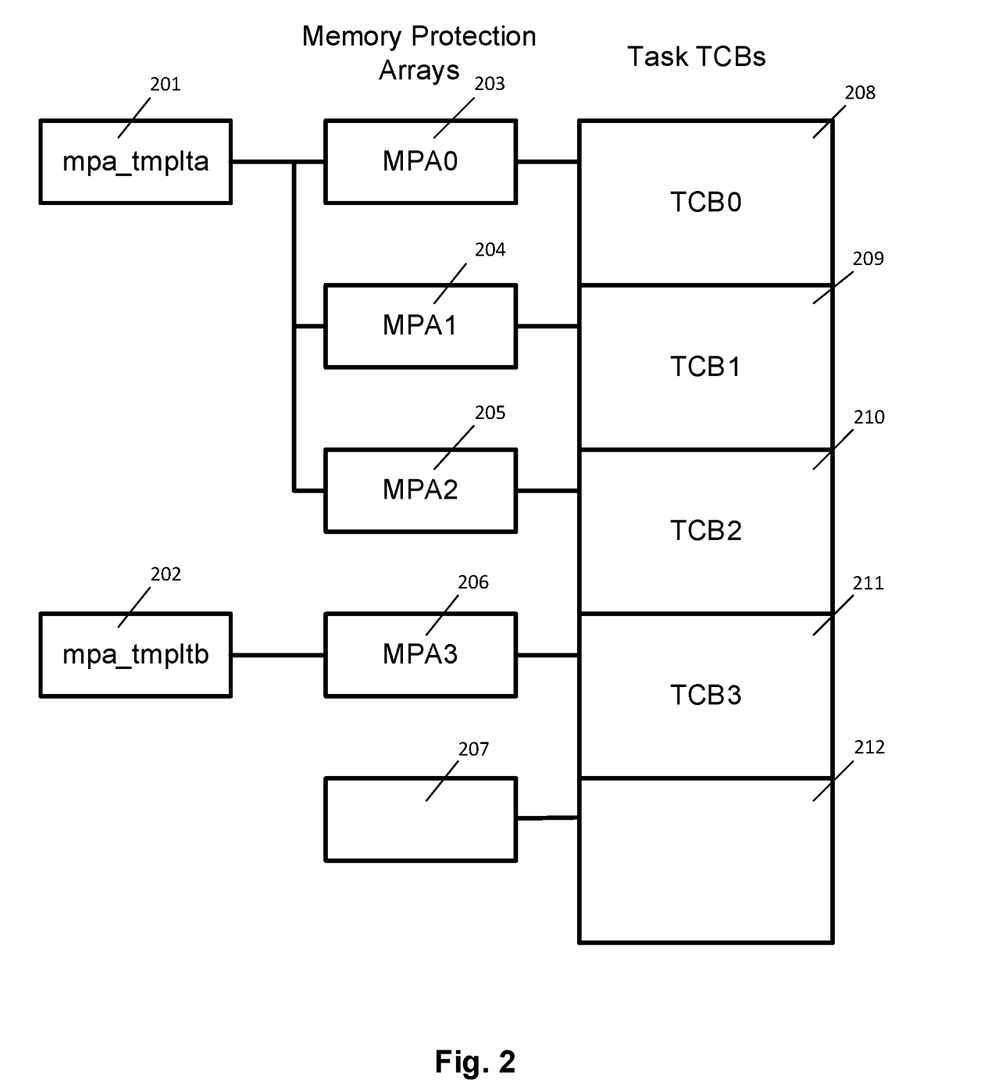
FIG. 2 shows the relationship of MPA templates to Memory Protection Arrays (MPAs) and the relationship of MPAs to Task Control Blocks (TCBs).
Figure 3:
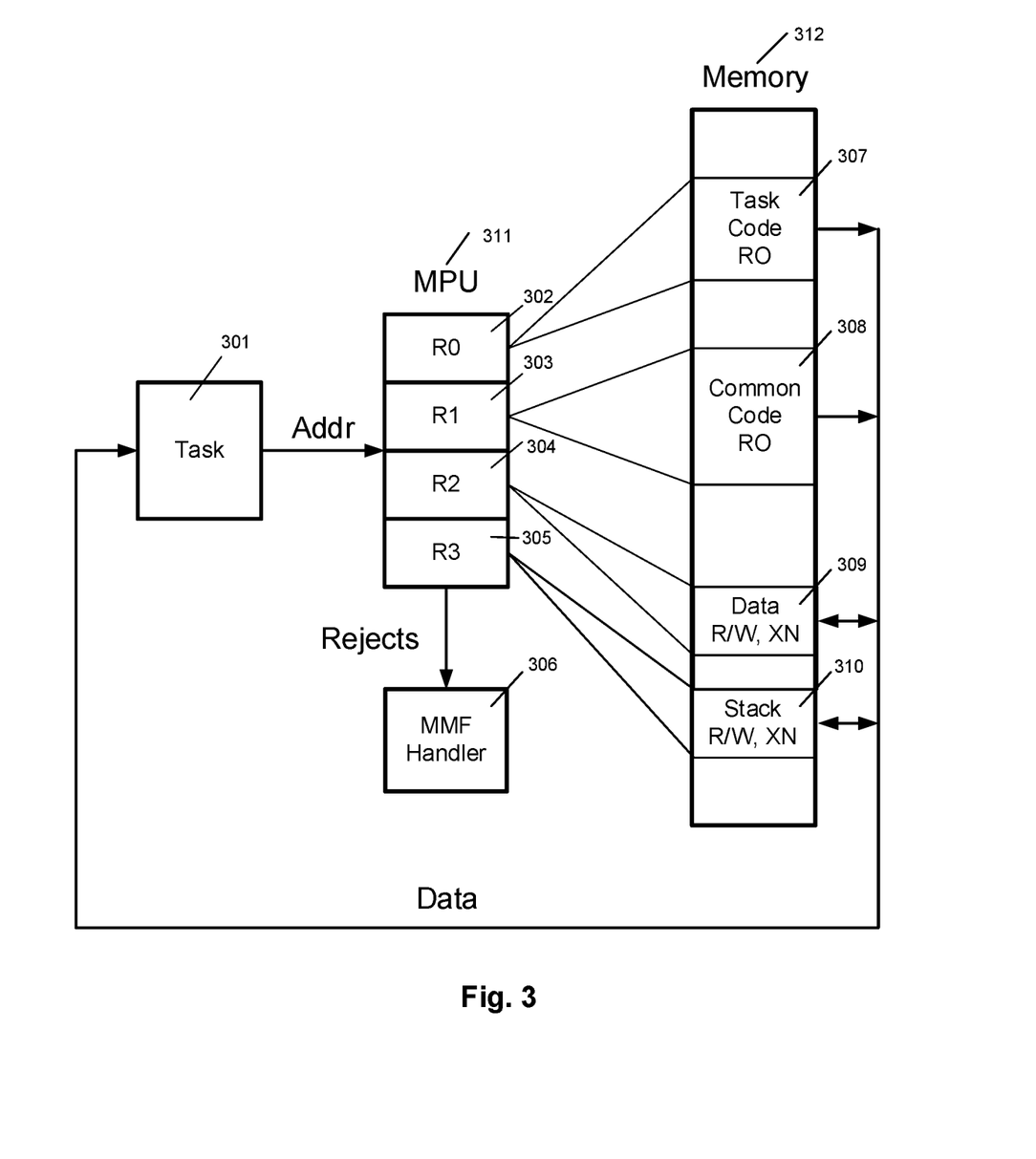
FIG. 3 illustrates MPU operation for the current task that is running. Each region in the MPU allows access to a specific memory region, as shown.

The following information describes a simple embodiment of the invention sufficient to explain how it works. The term "application" is understood to mean the software in an embedded device that performs the function of that device. FIGS. 1-3 illustrate the structure and operation of the preferred embodiment. Arm Cortex-M MPUs are available with 4, 8, or 16 slots. All figures use 4 slots, for simplicity. However, it should be apparent to one skilled in the art that these figures equally apply to MPUs with 8 or 16 slots and also to MPUs with other numbers of slots.

FIG. 1 shows an embodiment of the invention consisting of processor 101 sending a memory address 102 to a Memory Protection Unit (MPU) 103. The memory protection unit 103 compares the address to the MPU's regions and passes the address on to the system address bus 105 if it is ok. Otherwise, MPU 103 sends a Memory Mange Fault (MMF) exception 106 back to processor 101 and no access to memory or I/O occurs. If ok, the address is sent to Read/Write Memory 108, Read-Only Memory 109, and I/O Device 110. Whichever of these recognizes the address then receives data from processor 101 via system data bus 107 or sends data to processor 101 via system data bus 107. It should be apparent to one skilled in the art that there can be multiple memories and multiple devices connected to the system bus and also that each has a unique address range that falls within the addressable area processor 101 and MPU 103.

FIG. 2 shows that Memory Protection Array (MPA) template 201 is shared by MPAs 203, 204, and 205 and that MPA 203 is linked to Task Control Block (TCB) 208, MPA 204 is linked to TCB 209, and MPA 205 linked to TCB 210. On the other hand, template 202 is used only by MPA 206, which is linked to TCB 211. MPA 207 and TCB 212 are not in use. When a task is started or resumed, the MPA linked to its TCB is loaded into the MPU. Hence, that MPA governs what regions that task can access. This, in turn, is controlled by the template created by the programmer and loaded into the MPA.

FIG. 3 illustrates MPU operation. It shows task 301 sending an address to MPU 311 having 4 regions, as follows: Region 302 addresses task code read-only region 307 in memory 312. Region 303 addresses common code read-only region 308. Region 304 addresses data read/write execute-never region 309. Region 305 addresses stack read/write, execute-never Region 310. An address that does not fall into one of these regions or does not have the correct attributes goes to the Memory Manage Fault Handler (MMF) 306. Otherwise, task 301 is allowed to read or write the desired data.

Figure 4:
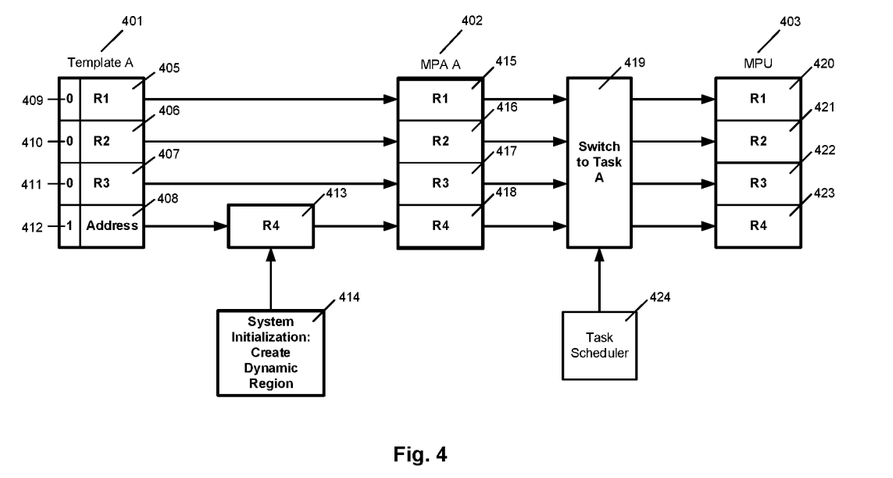
FIG. 4 illustrates operation of a dynamic region. It shows handling of a dynamic template slot that contains the address of a dynamic region rather than the region itself.

FIG. 4 illustrates dynamic region operation. Template 401 has static regions 405, 406, and 407 as indicated by false (0) flags 409, 410, and 411, respectively. These regions are determined at link time and cannot be altered while running. They are loaded directly into MPA 402 regions 415, 416, and 417, respectively. Template region 408 is a dynamic region as indicated by true flag 412. Hence it contains an address which points to dynamic region 413, which has been created and loaded during system initialization 414. Dynamic region 413 is loaded into MPA 402 region 418. Then, when task 419 is started or resumed, MPA 402 regions 415 to 418 are loaded into MPU 403 regions 420 to 423, respectively by task scheduler 424. The difference from normal operation is that region 413 is not determined at link time, but rather it is determined during system initialization—i.e. when the system starts running. This provides an easy manner to make region 412 dependent upon installation or operational parameters. For example, the size of a data buffer might be determined by the amount of RAM available in a particular installation, where a larger buffer would permit faster operation. Similarly the size of a code region might depend upon which options are installed in a particular installation.

Figure 5A:
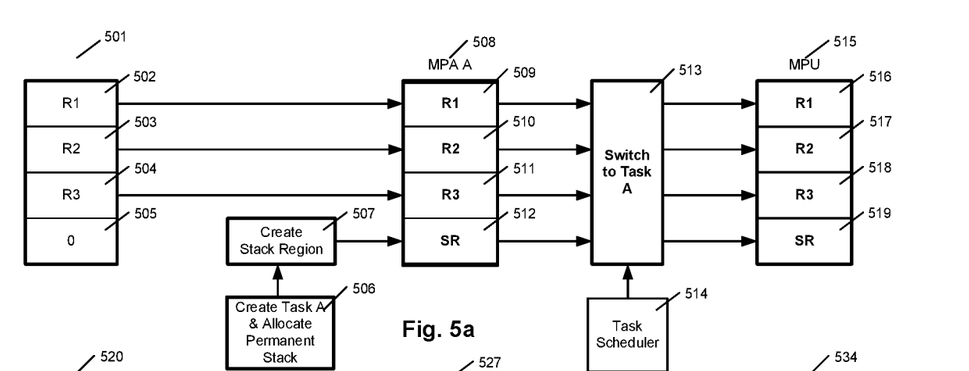
FIG. 5a shows getting a protected permanent task stack.

FIG. 5a shows getting a protected permanent task stack. Template 501 consists of static regions 502, 503, and 504 and open (0) region 505. When task 506 is created, it gets a permanent stack, usually from a heap and it creates a permanent region 507 for it. After task 506 has been created, static regions 502, 503, and 504 are copied to its MPA 508 regions 509, 510, and 511, respectively, and stack region 507 is loaded into MPA 508 region 512. When task 506 is started or resumed by task scheduler 514, MPA 508 regions 509 to 512 are loaded into MPU 515 regions 516 to 519, respectively.

Figure 5B:
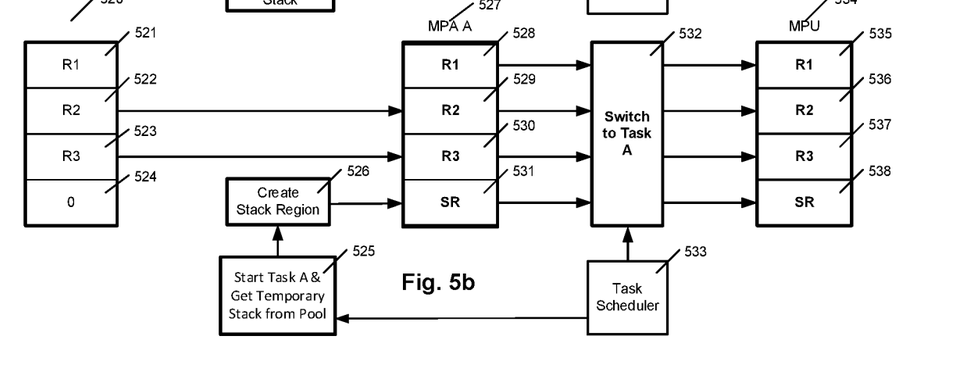
FIG. 5b shows getting a protected temporary task stack from a stack pool.

FIG. 5b shows getting a protected temporary task stack from a stack pool. Template 520 consists of static regions 521, 522, and 523 and open (0) region 524. When task 525 is created, it does not get a stack. After this, static regions 521, 522, and 523 are copied to its MPA 527 regions 528, 529, and 530, respectively, but no stack region is loaded into MPA 527 region 531. When task 525 is started by task scheduler 533, it gets a temporary stack from a stack pool, creates stack region 526 and loads it into MPA 527 region 531. Thereafter, when task 525 is started or resumed by scheduler 533, MPA 527 regions 528 to 531 are loaded into MPU 534 regions 535 to 538, respectively.

Figure 6:
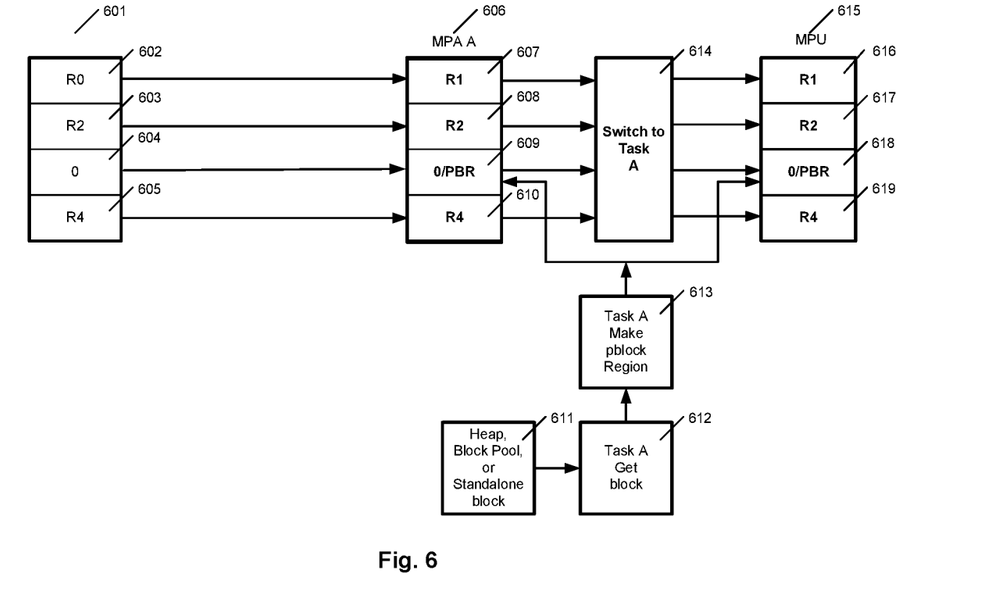
FIG. 6 shows getting a dynamic protected block.

FIG. 6 shows getting a dynamic protected block (pblock) in region 3. Template 601 consists of static regions 602, 603, and 605 and open (0) region 604. During initialization regions 602 to 605 are loaded into MPA 606 to 610, respectively (region 609 ends up with 0). When task 612 is started 614, MPA 606 regions 607 to 610 are loaded into MPU 615 regions 616 to 619, respectively. So, initially MPU 615 region 618 is 0. While task 612 is running, it gets a heap, block pool, or standalone block 611 and creates a dynamic data region 613 for it, making block 611 into pblock 611. pblock region 613 is loaded into MPA 606 region 609 and MPU 615 region 618 (since task 612 is running). This permits task 612 immediate access to pblock 611. Thereafter, whenever task 612 is resumed MPA 606 region 609 is loaded into MPU 615 region 618 along with the static regions. At some later time, task 612 may release pblock 611 or replace it with another pblock or pmsg (see below) of different size and/or different attributes.

Figures 7A, 7B:
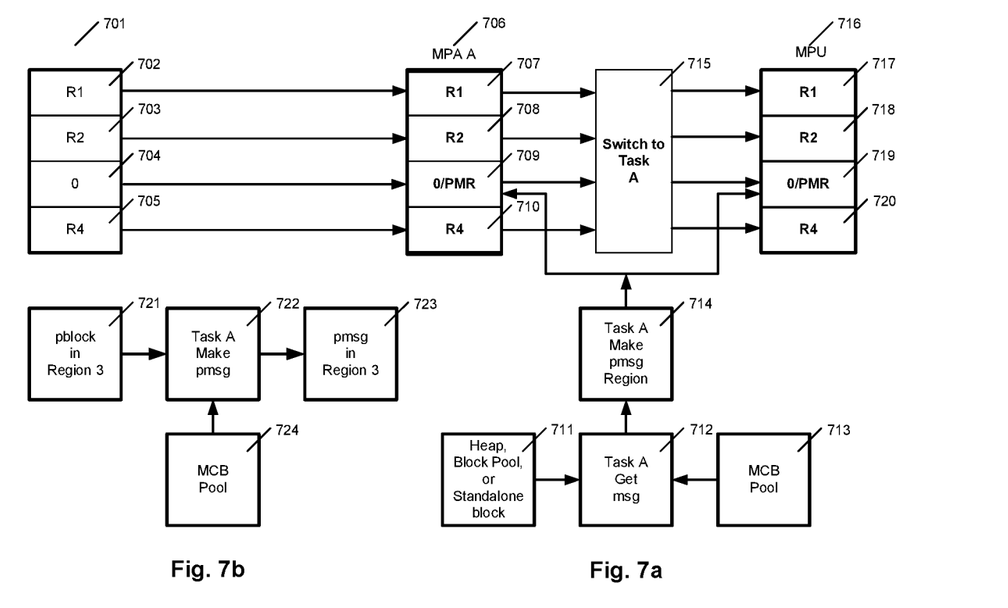
FIG. 7a shows getting a dynamic protected message.
FIG. 7b shows making a dynamic protected message from a protected block.

FIG. 7a shows getting a dynamic protected message (pmsg) in region 3. Template 701 consists of static regions 702, 703, and 705 and open (0) region 704. During initialization regions 702 to 705 are loaded into MPA 706, regions 707 to 710, respectively. When task 712 is started 715, MPA 706 regions 707 to 710 are loaded into MPU 716 regions 717 to 720, respectively. So, initially MPU 716 region 719 is 0. While task 712 is running, it gets a heap, block pool, or standalone block 711, it gets a Message Control Block (MCB) 713 creating a message, and it creates a dynamic data region 714 for it, making block 711 into pmsg 711. pmsg region 714 is loaded into MPA 706 region 709 and MPU 716 region 719 (since task 712 is running). This permits task 712 immediate access to pmsg 711. Thereafter, whenever task 712 is resumed MPA 706 region 709 is loaded into MPU 716 region 719 along with the static regions. At some later time, task 712 may send or release pmsg 711 and replace it with another pmsg or pblock of different size and/or different attributes.

FIG. 7b shows making a pmsg from a pblock. Here task 722 adds MCB 724 to pblock 721 in region 3 to create pmsg 723 in region 3. This conversion allows the data in the pblock to be sent to another task as a pmsg.

Figure 8:
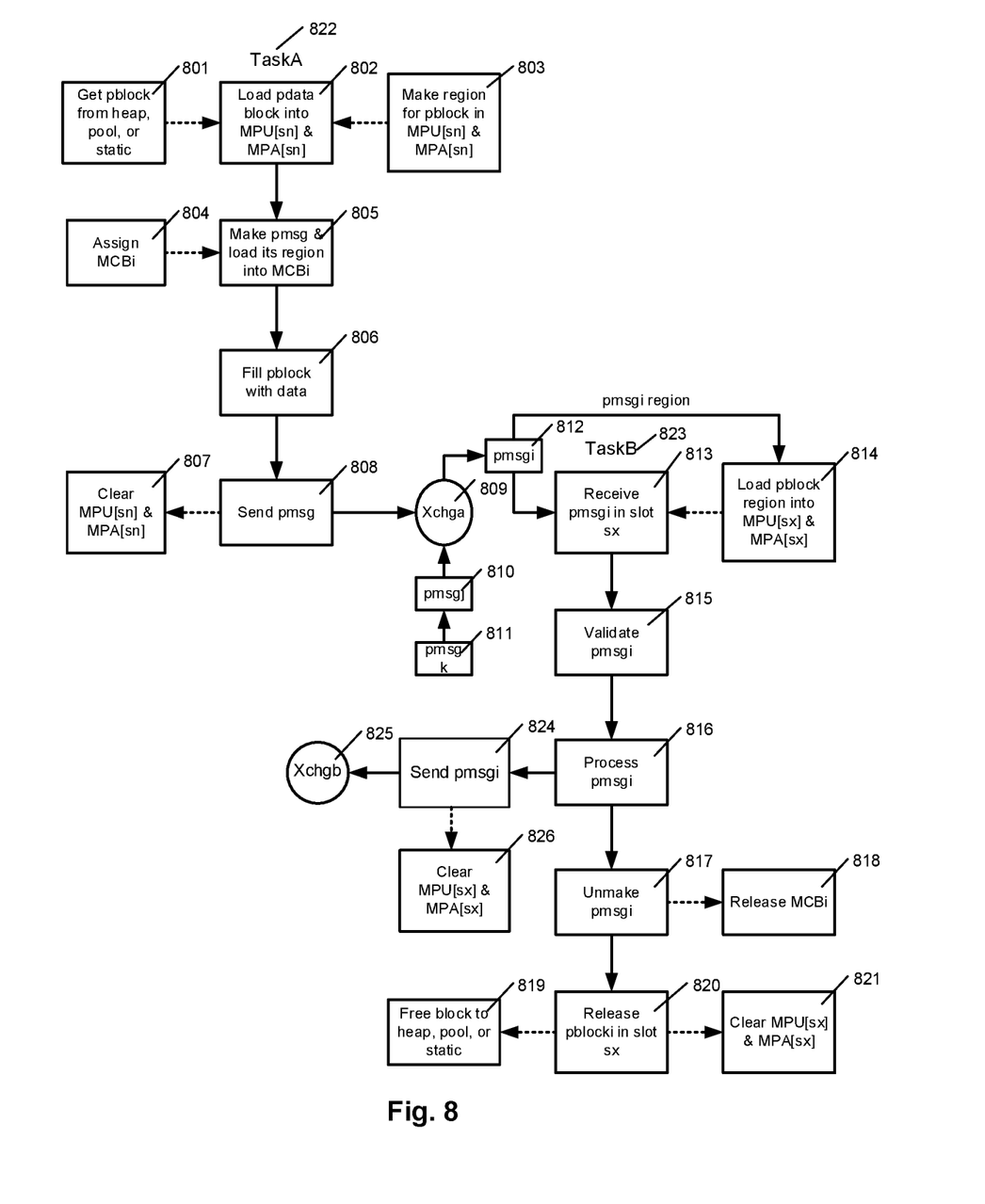
FIG. 8 shows the process for creating a protected message, filling it with data, sending it to an exchange, receiving it, validating it, processing it, then releasing it or sending it to another exchange.

FIG. 8 shows the process for creating a pmsg, filling it with data, sending it to an exchange, receiving it, validating it, processing it, then releasing it or sending it to another exchange. TaskA 822 performs the following operations: Protected block (pblock) 801 is obtained from heap, block pool, or a static block, region 803 is made for it and loaded 802 into MPU[sn] and TaskA MPA[sn]. Message Control Block, MCBi 804 is obtained from the MCB pool (not shown), combined with pblock 801 to create pmsg 805. Then pblock 801 region information is loaded into MCBi 804. pblock 801 is filled with data 806, then pmsg 805 is sent 808 to message exchange 809. MPU[sn] and TaskA MPA[sn] are simultaneously cleared 807 so that TaskA 822 can no longer access pmsg 805. pmsg 805 may be enqueued at exchange xchga 809 with other pmsgs 810 and 811, which may have been sent from other tasks.

TaskB 823 performs the following operations: pmsgs are received from exchange 809 as determined by their priority and/or wait time. Eventually pmsgi 812 is received 813 and its region from its MCB 804 is loaded into MPU[sx] and TaskB MPA[sx] 814. Note that sx is a free slot in TaskB MPA 814 that is not necessarily the same as the sn free slot in TaskA MPA 802. pmsgi 812 is validated 815 then processed 816 and finally unmade 817. The latter consists of releasing MCBi 818 back to the MCB pool (not shown), releasing pblocki 820 back to heap, pool, or static 819 and clearing MPU[sx] and TaskB MPA[sx] 821 so that TaskB 823 can no longer access pmsgi 812. Alternatively pmsgi may be sent 824 to another exchange xchgb 825 from which it can be received by another task. In this case, MPU[sx] and TaskB MPA[sx] are also cleared 826 so that TaskB 823 can no longer access pmsgi 812.

For one skilled in the art, it should be apparent that a template can allow for one or more dynamic regions, pblocks, and/or pmsgs at the same time and that these are not limited to the slots as shown, thus a task can have access to more than one of these objects at the same time, if necessary. However, only one protected task stack can be present at a time.

CONCLUSIONS, RAMIFICATIONS, AND SCOPE

One size fits all is frequently not the case for embedded system products. There may be extra-cost options and different models of a product may have different amounts of memory and processor performance. Installations in different environments may necessitate product variability and embedded systems often must adapt to real-time changes in operational requirements—e.g. when something goes wrong.

It is possible to use compile-time configuration constants to deal with some of this system variability. However doing so can result in a manufacturer needing to support many versions of its software in the field. Since Over The Air (OTA) updates are becoming increasing common in order to counter security breaches, multiple versions could become onerous for the support staff. For one thing, every change must be configured and tested for each different software version. This can slow down getting vital fixes to the field and can result in errors and confusion. Hence, a manufacturer may prefer to ship limited versions of its software, possibly just one. In that case, options must be enabled at shipment or installation time with jumpers, switches, or other physical means. If an option is not enabled, its code and variables should be excluded from all active regions. Then its attempted use will result in a Memory Manage Fault (MMF). This is useful to reduce the hacker attack surface and as well as to prevent unauthorized use of the option.

As should be apparent to one skilled in the art, dealing with the dynamic system variations discussed above is not compatible with static regions defined at compile/link time. Although doing so may not be impossible, it obviously complicates the programmer's job, which in turn may cause schedule overruns and latent bugs. Note that this is not a problem with non-secure systems. It is only a problem with systems that have been divided into isolated partitions that have unique regions in order to achieve better security. Hence, design teams may opt to omit or to postpone security in order to achieve their schedule commitments. As a consequence, dynamic regions may have significant impact upon future embedded system security by making security easier to add.

The following paragraphs discuss the reasons for and the advantages of each major aspect of the inventive material:
 1. Dynamic regions are ideal to handle variable-size buffers and to handle code options. For example, a low-end system could get a small data buffer, whereas a higher-end system could get a larger buffer giving it better performance. Another example is that a code region could exclude code that is optioned out or select between code bodies having different features.

Dynamic regions are created during system initialization following system boot.
2. Permanent protected task stacks can be of the exact size needed by a task. Then, underflow (excessive pops) or overflow (excessive pushes) can be immediately detected and corrective action taken. Stack manipulation is a hallmark of malware.
3. Temporary protected task stacks are used by one-shot tasks which run once, then stop and release their stacks until needed again. Dividing an application into multiple partitions can greatly increase the number of tasks and stacks needed. Each partition must have a task and each portal may require a task. In addition, the more tasks, the smaller partitions can be and too few MPU slots can also dictate having more tasks. Hence a system that needed only 6 tasks without security may end up needing 20 or more tasks with security, each needing a stack. Task stacks tend to be rather large in the range of 500 to 1000 bytes. Thus partitioning could increase needed read/write memory by 20-30 KB, which may exceed available RAM in a typical of embedded systems. Fortunately, most partition and portal tasks can be implemented as one-shot tasks, which run only when needed and share perhaps 2 or 3 stacks from a common stack pool—a big reduction in memory.
4. Protected data blocks (pblocks) are dynamically created and used by tasks. Buffer overflows cause immediate MMFs. Attempts to execute from buffers also cause immediate MMFs, defeating two more common hacking techniques. pblocks are allocated during runtime and thus can be fit to varying needs. For example a task may need a very large buffer. When allowed to run it gets a large pblock. Other tasks needing buffers are forced to wait. Then the first task finishes, releases its pblock, and the other tasks are allowed to run. In effect, the protected RAM region each task is allowed to access varies with time.
5. Protected messages (pmsgs) can be dynamically created, loaded with data, sent to another task, and dynamically freed by the receiving task when no longer needed. This capability is helpful to create secure portals that permit safe communication between isolated partitions. Protected messages are accessible to only one partition at a time. Thus, a hacker cannot change a message being processed by another partition in order to compromise that partition. Nor can a hacker overflow a message, execute from a message, or modify a read-only message. These features prevent hacker attempts to use messages to breach other partitions from a partition they have infected. Very importantly, a pmsg carries its own region, which can be loaded into any slot of the receiver's MPA/MPU. Thus the receiver can only access the pmsg, itself, and can only do so as permitted by its attributes (e.g. read-only).

The invention claimed is:

1. Methods for creating and using dynamic Memory Protection Unit (MPU) regions for enhanced system security, as follows:
comprising a Memory Protection Array (MPA) and an MPA template per task in said systems, each consisting of multiple regions, each said region consisting of a starting address, size, possibly subregion disables, and attributes for a block of memory, and said template is loaded into said MPA before said task begins running and said MPA is loaded into said MPU whenever said task starts running;
comprising dynamic MPU regions in said MPA templates, which permit actual MPU regions to be created during system initialization, thus allowing accommodation to differing runtime environments without compromising security;
comprising a task stack regions created when said task is created or dispatched, which protects against stack overflow, underflow, and stack execution, thus blocking frequently used hacking techniques;
comprising creating protected data blocks, during runtime, each consisting of a data block meeting MPU size and alignment requirements and a region for said data block, and said protected data blocks protect against overflow, underflow, data execution, and modification of read-only data, thus blocking additional frequently used hacking techniques, and said protected data blocks can be used for buffers and other internal task requirements, then released for reuse by other tasks or resized, as needed, thus reducing total RAM requirements for systems with limited memory;
comprising creating protected messages, during runtime, each consisting of a data block meeting MPU size and alignment requirements, a region, and a Message Control Block (MCB), and said protected messages protect against overflow, underflow, data execution, modification of read-only memory, invalid access, and each said protected messages contains its own security information, which can be loaded into an empty slot in said MPA of a task receiving said protected message and into said MPU and thus enable safe inter-task communication.

2. The method of claim 1 wherein said MPA template may have one or more dynamic slots, each having its dynamic slot flag set and each having a pointer to a dynamic region, which can be created during initialization, and said region being loaded into said MPA, when said MPA template is loaded into said MPA.

3. The method of claim 2 wherein said dynamic region can be a data or a memory-mapped Input/Output region.

4. The method of claim 2 wherein said dynamic region can be a code region.

5. The method of claim 1 wherein one region of said MPA template is designated as the task stack region to be used while said task runs.

6. The method of claim 5 wherein a task stack is permanently allocated to a task and said task stack region is created for it when said task is created and said task stack region is loaded into said task's MPA.

7. The method of claim 5 wherein a task stack is temporarily allocated to a task and said task stack region is created for it and loaded into said task's MPA when said task is started the first time.

8. The method of claim 1 wherein one or more regions of said MPA template are designated for use as protected data block regions, which are created and deleted during run time, thus allowing application software to use said regions for different protected data blocks at different times in order to deal with varying run time requirements for data blocks.

9. The method of claim 8 wherein said data block is allocated from a heap able to allocate blocks that meet size and alignment requirements of said MPU, and a region is created for it and loaded into said task's MPA and said MPU when said task is ruining and when said data block is deallocated to said heap, its said region is deleted from said MPU and from said task's MPA so that said data block can no longer be accessed by said task.

10. The method of claim 8 wherein said data block is allocated from a block pool in which every block meets size and alignment requirements of said MPU, and a region is created for it and loaded into said task's MPA and said MPU when said task is running and when said data block is returned to said block pool, its said region is deleted from said MPU and from said task's MPA so that said data block can no longer be accessed by said task.

11. The method of claim 8 wherein said data block is a data block created at compile time that meets size and alignment requirements of said MPU, and a region is created for it and loaded into said task's MPA and said MPU when said task is running and when said data block is no longer needed, its said region is deleted from said MPU and from said task's MPA so that said data block can no longer be accessed by said task.

12. The method of claim 1 wherein one or more regions of said MPA template are designated for use for protected message regions that are created and deleted during run time, thus allowing application software to use said regions in said MPU for said protected messages that can be received from or sent to other tasks.

13. The method of claim 12, wherein said protected message can be made from an existing protected data block and can be unmade into a protected data block or said protected message can be allocated and deallocated in the same manner as a protected data block.

14. The method of claim 12, wherein said protected message can be received by a receiving task from a message exchange and its region put into said MPU and into said receiving task's MPA and when said protected message is no longer needed its region is deleted from said MPU and from said task's MPA so that said protected message can no longer be accessed by said receiving task.

15. The method of claim 12, wherein said protected message can be sent to a message exchange by a sending task and its region is deleted from said MPU and from said sending task's MPA so that said protected message can no longer be accessed by said sending task, thus enhancing isolation between tasks.

16. The method of claim 12, wherein said protected message can be sent to a message exchange by a sending task and its region is not deleted from said MPU and said sending task's MPA so that said protected message can still be accessed by said sending task and simultaneously accessed by said receiving task, thus enabling multi-block data transfers between tasks.

* * * * *